US009368789B2

(12) United States Patent
Manthiram et al.

(10) Patent No.: US 9,368,789 B2
(45) Date of Patent: Jun. 14, 2016

(54) NANOCOMPOSITE ANODE MATERIALS FOR SODIUM-ION BATTERIES

(71) Applicant: Board of Regents, The University of Texas System, Austin, TX (US)

(72) Inventors: Arumugam Manthiram, Austin, TX (US); Il Tae Kim, Austin, TX (US); Eric Allcorn, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 165 days.

(21) Appl. No.: 14/253,509

(22) Filed: Apr. 15, 2014

(65) Prior Publication Data

US 2014/0308583 A1    Oct. 16, 2014

Related U.S. Application Data

(60) Provisional application No. 61/812,409, filed on Apr. 16, 2013.

(51) Int. Cl.
| | | |
|---|---|---|
| H01M 10/054 | (2010.01) | |
| H01M 4/36 | (2006.01) | |
| H01M 4/62 | (2006.01) | |
| H01M 4/134 | (2010.01) | |
| H01M 4/38 | (2006.01) | |

(52) U.S. Cl.
CPC .............. *H01M 4/362* (2013.01); *H01M 4/134* (2013.01); *H01M 4/62* (2013.01); *H01M 4/38* (2013.01); *H01M 10/054* (2013.01); *Y02E 60/122* (2013.01)

(58) Field of Classification Search
CPC ... H01M 10/054; H01M 4/134; H01M 4/362; H01M 4/38; H01M 4/62; Y02E 60/122
See application file for complete search history.

(56) References Cited

U.S. PATENT DOCUMENTS

2010/0261059 A1    10/2010    Im et al.

FOREIGN PATENT DOCUMENTS

| JP | 2005-158305 A | 6/2005 |
| JP | 2009-110748 | 5/2009 |
| KR | 10-2009-0041950 A | 4/2009 |
| KR | 10-2010-0113826 A | 10/2010 |
| WO | 2010-138760 A2 | 12/2010 |

OTHER PUBLICATIONS

I.T. Kim, E. Allcorn, and A. Manthiram. High-performance MxSb-Al2O3-C (M = Fe, Ni, and Cu) Nanocomposite Alloy Anodes for Sodium-ion Batteries, vol. 1, Issue 5-6, Jun. 2013, 319-326.*
J.-M. Tarascon, Nat. Chem. 2010, 2, 510.
V. Palomares, P. Serras, I. Villaluenga, K. B. Hueso, J. Carretero-Gonzalez, T. Rojo, Energy Environ. Sci. 2012, 5, 5884-5901.
A. Ponrouch, E. Marchante, M. Courty, J.-M. Tarascon, M. Rosa Palacin, Energy Environ. Sci. 2012, 5, 8572-8583.
X. Lu, G. Xia, J. P. Lemmon, Z. Yang, J. Power Sources, 2010, 195, 2431-2442.
Y. Cao, L. Xiao, W. Wang, D. Choi, Z. Nie, J. Yu, L. V. Saraf, Z. Yang, J. Liu, Adv. Mater. 2011, 23, 3155-3160.
R. Berthelot, D. Carlier, C. Delmas, Nat. Mater. 2011, 10, 74-80.
J. Qian, M. Zhou, Y. Cao, X. Ai, H. Yang, Adv. Energy Mater. 2012, 2, 410-414.
R. Alcantara, M. Jaraba, P. Lavela, J. L. Tirado, Chem. Mat. 2002, 14, 2847-2848.
K. T. Lee, T. N. Ramesh, F. Nan, G. Bolton, L. F. Nazar, Chem. Mat. 2011, 23, 3593-3600.
J. F. Whitacre, A. Tevar, S. Sharma, Electrochem. Commun. 2010, 12, 463-466.
Y. Kawabe, N. Yabuuchi, M. Kajiyama, N. Fukuhara, T. Inamasu, R. Okuyama, I. Nakai, S. Komaba, Electrochem. Commun. 2011, 13, 1225-1228.
R. Alcantara, J. M. Jimenez-Mateos, P. Lavela, J. L. Tirado, Electrochem. Commun. 2001, 3, 639-642.
S. Wenzel, T. Hara, J. Janek, P. Adelhelm, Energy Environ. Sci. 2011, 4, 3342-3345.
M. M. Doeff, Y. P. Ma, S. J. Visco, L. C. Dejonghe, J. Electrochem. Soc. 1993, 140, L169-L170.
D. A. Stevens, J. R. Dahn, J. Electrochem. Soc. 2000, 147, 1271-1273.
X. Xia, M. N. Obrovac, J. R. Dahn, Electrochem. Solid St. 2011, 14, A130-A133.
D. Applestone, S. Yoon, A. Manthiram, J. Mater. Chem. 2012, 22, 3242-3248.
D. Applestone, S. Yoon, A. Manthiram, J.Phys. Chem. C 2011, 115, 18909-18915.
S. Yoon, A. Manthiram, Chem. Mat. 2009, 21, 3898-3904.
C.-M. Park, K.-J. Jeon, Chem. Commun. 2011, 47, 2122-2124.
Z. Chen, Y. Cao, J. Qian, X. Ai, H. Yang, J. Mater. Chem. 2010, 20, 7266-7271.
S.-C. Chao, Y.-F. Song, C.-C. Wang, H.-S. Sheu, H.-C. Wu, N.-L. Wu, J. Phys. Chem. C 2011, 115, 22040-22047.
J. Qian, Y. Chen, L. Wu, Y. Cao, X. Ai, H. Yang, Chem. Commun. 2012, 48, 7070-7072.
L. Xiao, Y. Cao, J. Xiao, W. Wang, L. Kovarik, Z. Nie, J. Liu, Chem. Commun. 2012, 48, 3321-3323.

(Continued)

*Primary Examiner* — Carlos Barcena
(74) *Attorney, Agent, or Firm* — Baker Botts L.L.P.

(57) ABSTRACT

The disclosure relates to an anode material for a sodium-ion battery having the general formula $AO_x$—C or $AC_x$—C, where A is aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), tantalum (Ta), silicon (Si), or any combinations thereof. The anode material also contains an electrochemically active nanoparticles within the matrix. The nanoparticle may react with sodium ion ($Na^+$) when placed in the anode of a sodium-ion battery. In more specific embodiments, the anode material may have the general formula $M_ySb$-$M'O_x$—C, Sb-$MO_x$—C, $M_ySn$-$M'C_x$—C, or Sn-$MC_x$—C. The disclosure also relates to rechargeable sodium-ion batteries containing these materials and methods of making these materials.

8 Claims, 14 Drawing Sheets
(11 of 14 Drawing Sheet(s) Filed in Color)

(56) References Cited

OTHER PUBLICATIONS

Q. Sun, Q.-Q. Ren, H. Li, Z.-W. Fu, Electrochem. Commun. 2011, 13, 1462-1464.
S. Komaba, T. Ishikawa, N. Yabuuchi, W. Murata, A. Ito, Y. Ohsawa, Acs Appl. Mater. Interfaces, 2011, 3, 4165-4168.
Chinese Office Action in PRC (China) Patent Application No. 201280049553.5 dated Sep. 25, 2015, 11 pages.
Supplementary European Search Report for Application No. EP 12 82 6331, date of completion of search Feb. 19, 2015, mailed Mar. 2, 2015, 7 pages.
Danielle Applestone et al., "Cu6Sn5-TiC-C nanocomposite alloy anodes with high volumetric capacity for lithium ion batteries", RSC Advances, vol. 2, No. 12, Apr. 13, 2012, p. 5411-5417.
Daniel Applestone et al., "Cu2Sb—Al2O3-C nanocomposite alloy anodes with exceptional cycle life or lithium ion batteries", Journal of Materials Chemistry, vol. 22, No. 7, Jan. 9, 2012, p. 3242-3248.
Sukeun Yoon et al., "Sb—Mo x -C (M=Al, Ti, or Mo) Nanocomposite Anodes for Lithium-Ion Batteries", Chemistry of Materials, vol. 21, No. 16, Aug. 25, 2009, pp. 3898-3904.
Sukeun Yoon et al., "Nanostructured SnTiC composite anodes for lithium ion batteries", Electrochimica ACTA, Elsevie Science Publishers, Barking, GB, vol. 56, No. 8, Dec. 30, 2010, pp. 3029-3035.
International Search Report and Written Opinion of International Application No. PCT/US2012/051173, mailing date Feb. 28, 2013, 10 pages.
International Preliminary Report on Patentability of International Application No. PCT/US2012/051173, mailing date Mar. 6, 2014, 6 pages.
Ji Hyun Sung et al., "Amorphized Sb-based composite for high-performance Li-ion battery anodes" Journal of Electroanalytical Chemistry 700 (2013) 12-16.
Office Action from Japanese Patent Application No. 2014-526216, 4 pages, dated Jan. 27, 2016.

* cited by examiner

NANOCOMPOSITE ANODE MATERIALS FOR SODIUM-ION BATTERIES

PRIORITY CLAIM

This application claims priority under 35 U.S.C. §119 to U.S. Provisional Patent Application Ser. No. 61/812,409 filed Apr. 16, 2013. The contents of which is incorporated by reference herein in its entirety.

STATEMENT OF GOVERNMENT INTEREST

The present invention was developed using funding from the United States government through Department of Energy Grant No. DE-SC005397. The United States government has certain rights in the invention.

TECHNICAL FIELD

The current invention relates to materials usable as anodes in batteries, particularly lithium-ion secondary (rechargeable) batteries. The invention also relates to anodes and batteries containing such materials. The invention further relates to methods of making the materials and anodes and batteries using such materials.

BACKGROUND

Basic Principles of Batteries and Electrochemical Cells

Batteries may be divided into two principal types, primary batteries and secondary batteries. Primary batteries may be used once and are then exhausted. Secondary batteries are also often called rechargeable batteries because after use they may be connected to an electricity supply, such as a wall socket, and recharged and used again. In secondary batteries, each charge/discharge process is called a cycle. Secondary batteries eventually reach an end of their usable life, but typically only after many charge/discharge cycles.

Secondary batteries are made up of an electrochemical cell and optionally other materials, such as a casing to protect the cell and wires or other connectors to allow the battery to interface with the outside world. An electrochemical cell includes two electrodes, the positive electrode or cathode and the negative electrode or anode, an insulator separating the electrodes so the battery does not short out, and an electrolyte that chemically connects the electrodes.

In operation the secondary battery exchanges chemical energy and electrical energy. During discharge of the battery, electrons, which have a negative charge, leave the anode and travel through outside electrical conductors, such as wires in a cell phone or computer, to the cathode. In the process of traveling through these outside electrical conductors, the electrons generate an electrical current, which provides electrical energy.

At the same time, in order to keep the electrical charge of the anode and cathode neutral, an ion having a positive charge leaves the anode and enters the electrolyte and a positive ion also leaves the electrolyte and enters the cathode. In order for this ion movement to work, typically the same type of ion leaves the anode and joins the cathode. Additionally, the electrolyte typically also contains this same type of ion. In order to recharge the battery, the same process happens in reverse. By supplying energy to the cell, electrons are induced to leave the cathode and join the anode. At the same time a positive ion, such as $Na^+$, leaves the cathode and enters the electrolyte and a $Na^+$ leaves the electrolyte and joins the anode to keep the overall electrode charge neutral.

In addition to containing an active material that exchanges electrons and ions, anodes and cathodes often contain other materials, such as a metal backing to which a slurry is applied and dried. The slurry often contains the active material as well as a binder to help it adhere to the backing and conductive materials, such as carbon particles. Once the slurry dries it forms a coating on the metal backing.

Unless additional materials are specified, batteries as described herein include systems that are merely electrochemical cells as well as more complex systems.

Anodes in Sodium-Ion Batteries

In order for a battery to function properly, the materials used in the anode, cathode and electrolyte are typically selected to have compatible electrical, chemical, and electrochemical properties. For instance, the materials may be selected to operate at compatible voltages. A variety of anodes have been developed for lithium-ion batteries and many varieties of such batteries have been commercially successful. The same is not true, however, of sodium-ion batteries, which often require a different anode or cathode than lithium-ion batteries due to a variety of differences between the lithium ion ($Li^+$) and the sodium ion ($Na^+$). In particular, the larger radius of $Na^+$ makes it difficult to find an electrode material that can reversibly contain $Na^+$. This had resulted in the development of very few commercially available sodium-ion batteries.

Examples of commercially available sodium-ion batteries include the Na/S battery and the $Na/NiCl_2$ battery (also called the ZEBRA battery). These batteries require the use of molten materials that are difficult to maintain. The use of simpler materials, such as carbon-based anodes, has been investigated, but has not resulted in a commercially viable product. For instance, a great deal of research has focused on hard carbon anodes (e.g. non-graphitizable carbon), which can deliver a reversible capacity of 200-300 mAh/g, but which suffer from poor reversibility. Similarly, graphite has proven to be unsuitable anode material because the large sodium ions cannot enter and intercalate properly. Due to the voltages at which sodium-ion batteries must operate, which is close to the voltage at which sodium ions convert to metallic sodium, all sodium ion batteries with a carbon anode also suffer from sodium plating, resulting in the formation of a solid-electrolyte interfacial (SEI) layer, which impede sodium ion movement, or dendrites, which may cause dangerous short circuits in the battery. Carbon anodes suffer from the further drawback of manganese poisoning when used with manganese-containing cathodes, which limits battery life.

Recently, in lithium-ion batteries, a new type of anode in which metallic and intermetallic materials that react with $Li^+$ to form an alloy have showed promise, but like other anodes, these materials must allow passage of the ion in order to function. Accordingly, this type of material has not previously been investigated for the much larger $Na^+$, which, as discussed above, does not readily function with most lithium-ion battery anodes.

SUMMARY

In one embodiment, the disclosure relates to an anode material for a sodium-ion battery. The anode material contains a matrix having the general formula $AO_x$—C, where A is aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), tantalum (Ta), silicon (Si), or any combinations thereof. The anode material also contains an electrochemically active nanoparticles within the matrix. The nanoparticle may react with sodium ion (Na$^+$) when placed in the anode of a sodium-ion battery.

In a more specific embodiment, the anode material has the general formula M$_y$Sb-M'O$_x$—C, where M is selected iron (Fe), copper (Cu), molybdenum (Mo), nickel (Ni), titanium (Ti), tin (Sn), or any combinations thereof, and M' is aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), tantalum (Ta), or any combinations thereof.

In another more specific embodiment, the anode material has the general formula Sb-MO$_x$—C, where M is aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), or any combinations thereof.

In another embodiment, the disclosure relates to an anode material for a sodium-ion battery. The anode material contains a matrix having the general formula AC$_x$—C, where A is aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), tantalum (Ta), silicon (Si), or any combinations thereof. The anode material also contains an electrochemically active nanoparticles within the matrix. The nanoparticle may react with sodium ion (Na$^+$) when placed in the anode of a sodium-ion battery.

In a more specific embodiment, the anode material has the general formula M$_y$Sn-M'C$_x$—C, where M is copper (Cu), molybdenum (Mo), nickel (Ni), titanium (Ti), zinc (Zn), or antimony (Sb), or any combinations thereof, and M' is titanium (Ti), vanadium (V), chromium (Cr), iron (Fe), cobalt (Co), nickel (Ni), molybdenum (Mo), tungsten (W), silicon (Si), or any combinations thereof.

In another more specific embodiment, the anode material has the general formula Sn-MC$_x$—C, where M is titanium (Ti), vanadium (V), chromium (Cr), iron (Fe), cobalt (Co), nickel (Ni), molybdenum (Mo), tungsten (W), silicon (Si), or any combinations thereof.

Other embodiments relate to anodes or rechargeable batteries containing these materials as well as methods of making these materials using ball-milling techniques.

In the general formulas used herein, hyphens "-" indicate chemical compositions that are intermingled to form a nanocomposite material. Chemical bonds may or may not be present between these components of a nanocomposite material.

The following abbreviations are commonly used throughout the specification:
Na$^+$—Sodium ion
Na$^0$—elemental or metallic sodium
M$_y$Sb—metal antimonide
Cu$_2$Sb—copper antimonide
FeSb$_2$—iron antimonide
NiSb—nickel animonide
M'O$_x$—metal oxide
Al$_2$O$_3$—aluminum oxide
M$_y$Sn—metal stannide
M'C$_x$—metal carbide
SEI—solid-electrolyte interfacial
HEMM—high-energy mechanical milling
XRD—X-ray diffraction
SEM—scanning electron microscopy
TEM—transmission electron microscopy
EIS—electrochemical impedance spectroscopy
CV—cyclic voltammogram

BRIEF DESCRIPTION OF THE DRAWINGS

The patent or application file contains at least one drawing executed in color. Copies of the patent or patent application publication with color drawing(s) will be provided by the Office upon request and payment of the necessary fee.

DETAILED DESCRIPTION

Figure 1:
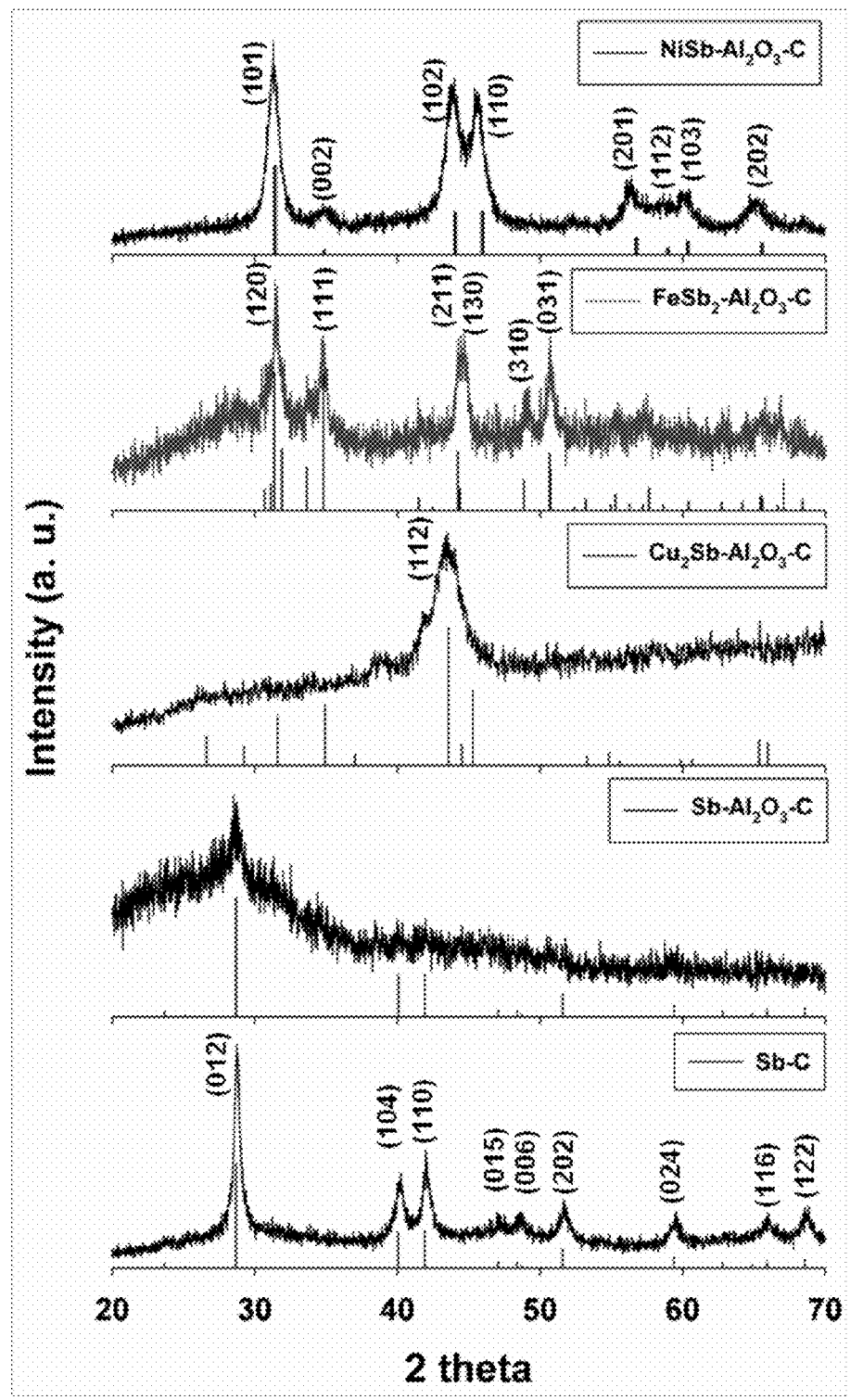
FIG. 1 provides XRD patterns of Sb—C, Sb—Al$_2$O$_3$—C, and M$_x$Sb—Al$_2$O$_3$—C (M=Fe, Ni, and Cu) nanocomposites obtained by the mechanochemical reduction reaction.

The current disclosure relates to nanocomposite anode materials for sodium-ion batteries, anodes and batteries containing such materials, and methods of making these materials. Although the anode materials are typically described herein in their desodiated forms, when used in a rechargeable sodium-ion battery, they will additionally contain sodium ions ($Na^+$) in amounts that will vary as the battery cycles through its charged and discharged states. The number of $Na^+$ that may be in any general chemical formula will depend on the number of elections gained by the anode material when that battery is in a fully charged state as compared to a fully discharged state.

All embodiments of the present disclosure contain a carbon-inactive material matrix that contains nanoparticles of an electrochemically active material. This matrix acts as a buffer to accommodate volume changes in the electrochemically active material as sodium ions enter and leave the electrochemically active material during battery cycling.

The matrix material has the general formula $AO_x$—C or $AC_x$—C, wherein A is a metal such as aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), or combinations thereof, or similar metals and combinations thereof, or even a non-metal such as silicon (Si), or a similar non-metal, which may be used in combination with any of the above metals. The $AO_x$ or $AC_x$ may be amorphous or partially amorphous and may form a conductive carbon matrix with the C. The electrochemically active material may be dispersed within this matrix.

Nanocomposite anode materials with a matrix of the general formula $AO_x$—C or $AC_x$—C, particularly those materials described in further detail below, may have a capacity of 200-400 mAh/g at C/3 or higher current densities. These nanocomposite materials may be able to operate at higher voltages versus sodium as compared to carbon anodes and thus may be less likely to exhibit SEI layer formation or dendrite formation, making these anode safer than carbon anodes. Additionally, these materials may be more resistant to manganese poisoning than carbon anodes when combined with a manganese-containing cathode such as a sodium manganese oxide cathode.

Furthermore, anode materials with a matrix of the general formula $AO_x$—C or $AC_x$—C, particularly those materials described in further detail below, may allow the formation of an electrochemically active sodium-alloy material contained within the matrix during an alloying reaction (sodication), which may disappear during a dealloying reaction (desodation). Alternatively, the matrix may contain the electrochemically active material in different crystalline/amorphous phases during battery cycling (sodation and desodation). Even within a similar material, use of a different metal may result in differences in crystalline/amorphous phase changes.

Use of a matrix in combination with a sodium-ion-reactive electrochemically active species may help prevent or decrease large volume changes in the electrochemically active species during sodation and desodation. Due to the larger size of the sodium ion as compared to the lithium ion, sodium-ion batteries may otherwise experience more substantial volume changes than lithium-ion batteries. Furthermore, the larger size of the sodium ion may make re-intercalation into the electrochemically active material more difficult than when lithium ions are used. Thus, the matrix may prove particularly helpful for sodium-ion battery anode materials.

$M_y$Sb-$M'O_x$—C Materials

The first type of anode material has the general formula $M_y$Sb-$M'O_x$—C, where M may be a metal such as iron (Fe), copper (Cu), molybdenum (Mo), nickel (Ni), titanium (Ti), or tin (Sn), or combination thereof, or similar metals and combinations thereof, and where M' may be aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), or combinations thereof, or similar metals and combinations thereof. In specific embodiments, the first type of anode material may have the general formula $Cu_2$Sb—$Al_2O_3$—C, $FeSb_2$—$Al_2O_3$—C, or NiSb—$Al_2O_3$—C.

In specific embodiments, the material may be present in the form of a nanocomposite material in which nanostructured crystalline particles of $M_y$Sb are embedded in a matrix of the other materials and provide electrochemical activity to the nanocomposite. In the $M_y$Sb portion, a conductive M framework supports the electrochemically active Sb. $M'O_x$, which may also be referred to as a ceramic oxide, may be amorphous or partially amorphous. The —C portion forms a conductive carbon matrix with the $M'O_x$. $M_y$Sb is dispersed within this matrix.

In one embodiment, the particulate or crystalline nature of the $M_y$Sb portion of the $M_y$Sb-$M'O_x$—C anode material may not develop until after the material has been cycled in an electrochemical cell.

Materials of the general formula $M_y$Sb-$M'O_x$—C may reduce or minimize the effects of changes in volume as sodium ions enter and leave the material by blending nanostructured materials that are electrochemically active towards sodium ($M_y$Sb) with materials that are inactive towards sodium ($M'O_x$ and —C) to form nanocomposite anode materials. Although, in some embodiments, the nanostructured materials may offer shorter diffusion lengths for sodium ions and may accommodate the strain due to volume changes during battery cycling, the large surface-area-to-volume ratio resulting from the particles' small size and the high surface reactivity of these nanostructured materials may be problematic. The addition of $M'O_x$—C to form an inactive matrix may help buffer the volume change in the electrochemically active material during charge/discharge cycles. The $M'O_x$—C matrix may also reduce agglomeration of the $M_y$Sb particles, which is detrimental to battery performance.

Anode materials with the general formula $M_y$Sb-$M'O_x$—C typically operate at potentials sufficiently higher than the potential at which $Na^+$ converts to $Na^0$ to avoid plating of sodium metal on the anode, or to reduce the rate of plating to a rate sufficiently low to avoid failure of the battery due to a short circuit during its expected lifetime. The operational potential may also prevent or reduce formation of an SEI layer.

Anode materials with the general formula $M_y$Sb-M'$O_x$—C may be synthesized, in some embodiments, by mechanochemical reduction of $Sb_2O_3$ with M and M' metals in the presence of carbon. The carbon may be from an elemental or polymeric carbon source. For instance, it may be in the form of acetylene black or another similar material. In a specific embodiment, the mechanochemical reduction may be carried out in a single, one-step, high-energy mechanical milling (HEMM) process, which is a type of ball-milling process.

In another embodiment, anode materials of the general formula $M_y$Sb-M'$O_x$—C may be synthesized first by preparing an alloy using high temperature methods, followed by ball-milling.

The large irreversible capacity loss found in the first cycle with some anodes is partly related to the presence of residual oxides of the electrochemically active species like Sb, and such large irreversible loss can be reduced and the coulombic efficiency can be increased by subsequent annealing at moderate temperature in reducing atmospheres.

$M_y$Sn-M'$C_x$—C Materials

The second type of anode material has the general formula $M_y$Sn-M'$C_x$—C, where M may be a metal such as copper (Cu), molybdenum (Mo), nickel (Ni), titanium (Ti), zinc (Zn), or antimony (Sb), combinations thereof, or similar metals and combinations thereof, and where M' may be titanium (Ti), vanadium (V), chromium (Cr), iron (Fe), cobalt (Co), nickel (Ni), molybdenum (Mo), tungsten (W), or silicon (Si) or combinations thereof, or similar metals and combinations thereof.

In one embodiment, the particulate or crystalline nature of the $M_y$Sn portion of the $M_y$Sn-M'$C_x$—C anode material may not develop until after the material has been cycled in an electrochemical cell.

In an anode material with the general formula $M_y$Sn-M'$C_x$—C, nanostructured $M_y$Sn particles provide electrochemical activity and the conductive Cu framework supports the electrochemically active Sn. M'$C_x$ may be amorphous or partially amorphous. The —C portion forms a conductive carbon matrix with the M'$C_x$. $M_y$Sn is dispersed within this matrix.

Materials of the general formula $M_y$Sn-M'$C_x$—C may reduce or minimize the effects of changes in volume as sodium ions enter and leave the material by blending nanostructured materials that are electrochemically active towards sodium ($M_y$Sn) with materials that are inactive towards sodium (M'$C_x$ and —C) to form nanocomposite anode materials. Although, in some embodiments, the nanostructured materials may offer shorter diffusion lengths for sodium ions and may accommodate the strain due to volume changes during battery cycling, the large surface-area-to-volume ratio resulting from the particles' small size and the high surface reactivity of these nanostructured materials may be problematic. The addition of M'$C_x$—C to form an inactive matrix may help buffer the volume change in the electrochemically active material during charge/discharge cycles. The M'$C_x$—C matrix may also reduce agglomeration of the $M_y$Sn particles, which is detrimental to battery performance.

Anode materials with the general formula $M_y$Sn-M'$C_x$—C typically operate at potentials that are sufficiently higher than the potential at which $Na^+$ converts to $Na^0$ to avoid plating of sodium metal on the anode, or to reduce the rate of plating to a rate sufficiently low to avoid failure of the battery due to a short circuit during its expected lifetime. The operational potential may also prevent or reduce formation of an SEI layer.

Anode materials with the formula $M_y$Sn-M'$C_x$—C may be synthesized, in some embodiments, by first furnace heating a mixture of Sn and other metals and then ball-milling the resulting compounds in the presence of carbon to achieve a mechanochemical reduction. The carbon may be from an elemental or polymeric carbon source. For instance, it may be in the form of acetylene black or another similar material.

In another embodiment, anode materials of the general formula $M_y$Sn-M'$C_x$—C may be synthesized first by preparing an alloy using high temperature methods, followed by ball-milling.

Sb-$MO_x$—C Materials

The third type of anode material has the general formula Sb-$MO_x$—C, where M may be a metal such as aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), or combinations thereof, or similar metals and combinations thereof. In specific embodiments, the third type of anode material may have the general formula Sb—$Al_2O_3$—C.

In one embodiment, the particulate or crystalline nature of the Sb portion of the Sb-$MO_x$—C anode material may not develop until after the material has been cycled in an electrochemical cell.

In specific embodiments, the material may be present in the form of a nanocomposite material in which nanostructured crystalline particles of Sb are embedded in a matrix of the other materials and provide electrochemical activity to the nanocomposite. $MO_x$, which may also be referred to as a ceramic oxide, may be amorphous or partially amorphous. The —C portion forms a conductive carbon matrix with the $MO_x$. Sb is dispersed within this matrix.

Materials of the general formula Sb-$MO_x$—C may reduce or minimize the effects of changes in volume as sodium ions enter and leave the material by blending nanostructured materials that are electrochemically active towards sodium (Sb) with materials that are inactive towards sodium ($MO_x$ and —C) to form nanocomposite anode materials. Although, in some embodiments, the nanostructured materials may offer shorter diffusion lengths for sodium ions and may accommodate the strain due to volume changes during battery cycling, the large surface-area-to-volume ratio resulting from the particles' small size and the high surface reactivity of these nanostructured materials may be problematic. The addition of $MO_x$—C to form an inactive matrix may help buffer the volume change in the electrochemically active material during charge/discharge cycles. The $MO_x$—C matrix may also reduce agglomeration of the Sb particles, which is detrimental to battery performance.

Anode materials with the general formula Sb-$MO_x$—C typically operate at potentials sufficiently higher than the potential at which $Na^+$ converts to $Na^0$ to avoid plating of sodium metal on the anode, or to reduce the rate of plating to a rate sufficiently low to avoid failure of the battery due to a short circuit during its expected lifetime. The operational potential may also prevent or reduce formation of an SEI layer.

Anode materials with the general formula Sb-$MO_x$—C may be synthesized, in some embodiments, by mechanochemical reduction of $Sb_2O_3$ with M in the presence of carbon. The carbon may be from an elemental or polymeric carbon source. For instance, it may be in the form of acetylene black or another similar material. In a specific embodiment, the mechanochemical reduction may be carried out in a single, one-step, high-energy mechanical milling (HEMM) process, which is a type of ball-milling process.

In another embodiment, anode materials of the general formula Sb-MO$_x$—C may be synthesized first by preparing an alloy using high temperature methods, followed by ball-milling.

The large irreversible capacity loss found in the first cycle is partly related to the presence of residual oxides of Sb, and such large irreversible loss can be reduced and the coulombic efficiency can be increased by subsequent annealing at moderate temperature in reducing atmospheres.

Sn-MC$_x$—C Materials

The fourth type of anode material has the general formula Sn-MC$_x$—C, where M may be a metal such as titanium (Ti), vanadium (V), chromium (Cr), iron (Fe), cobalt (Co), nickel (Ni), molybdenum (Mo), tungsten (W), or silicon (Si) or combinations thereof, or similar metals and combinations thereof.

In one embodiment, the particulate or crystalline nature of the Sn portion of the Sn-MC$_x$—C anode material may not develop until after the material has been cycled in an electrochemical cell.

In an anode material with the general formula Sn-MC$_x$—C, nanostructured Sn particles provide electrochemical activity. MC$_x$ may be amorphous or partially amorphous. The —C portion forms a conductive carbon matrix with the M'C$_x$. Sn is dispersed within this matrix.

Materials of the general formula Sn-MC$_x$—C may reduce or minimize the effects of changes in volume as sodium ions enter and leave the material by blending nanostructured materials that are electrochemically active towards sodium (Sn) with materials that are inactive towards sodium (MC$_x$ and —C) to form nanocomposite anode materials. Although, in some embodiments, the nanostructured materials may offer shorter diffusion lengths for sodium ions and may accommodate the strain due to volume changes during battery cycling, the large surface-area-to-volume ratio resulting from the particles' small size and the high surface reactivity of these nanostructured materials may be problematic. The addition of MC$_x$—C to form an inactive matrix may help buffer the volume change in the electrochemically active material during charge/discharge cycles. The MC$_x$—C matrix may also reduce agglomeration of the Sn particles, which is detrimental to battery performance.

Anode materials with the general formula Sn-MC$_x$—C typically operate at potentials that are sufficiently higher than the potential at which Na$^+$ converts to Na$^0$ to avoid plating of sodium metal on the anode, or to reduce the rate of plating to a rate sufficiently low to avoid failure of the battery due to a short circuit during its expected lifetime. The operational potential may also prevent or reduce formation of an SEI layer.

Anode materials with the formula Sn-MC$_x$—C may be synthesized, in some embodiments, by first furnace heating a mixture of Sn and M and then ballmilling the resulting compounds in the presence of carbon to achieve a mechanochemical reduction. The carbon may be from an elemental or polymeric carbon source. For instance, it may be in the form of acetylene black or another similar material.

In another embodiment, anode materials of the general formula Sn-MC$_x$—C may be synthesized first by preparing an alloy using high temperature methods, followed by ball-milling.

Anodes and Batteries

The invention also includes anodes made from any of the anode materials described above. Such anodes may include a metal or other conductive backing and a coating containing the anode material. The coating may be formed by applying a slurry to the metal backing. The slurry and resulting coating may contain particles of the anode material. Although in many embodiments agglomerates may not be preferred, in other embodiments the coating may include agglomerates of particles of the anode material. The anode may contain only one type of anode material, or it may contain multiple types of anode materials, including additional anode materials different from those described above. The coating may further include conductive agents, such as carbon. Furthermore, the coating may contain binders, such as polymeric binders, to facilitate adherence of the coating to the metal backing or to facilitate formation of the coating upon drying of the slurry. In some embodiments the anode may be in the form of metal foil with a coating.

In another embodiment, the invention relates to a sodium-ion battery including an anode material as described above. The anode may of a type described above. The battery may further contain a cathode and an electrolyte to complete the basic components of an electrochemical cell. The cathode and electrolyte may be of any sort able to form a functional rechargeable battery with the selected anode material. The battery may further contain contacts, a casing, or wiring. In the case of more sophisticated batteries it may contain more complex components, such as safety devices to prevent hazards if the battery overheats, ruptures, or short circuits. Particularly complex batteries may also contain electronics, storage media, processors, software encoded on computer readable media, and other complex regulatory components.

The cathode in a battery using an anode described above may be any type of cathode suitable for use in a sodium-ion battery. In specific embodiments it may be a cathode of the type used in a Na/S battery or a Na/NiCl$_2$ battery such as S and NiCl$_2$.

Batteries may be in very traditional forms, such a coin cells or jelly rolls, or in more complex forms such as prismatic cells. Batteries may contain more than one electrochemical cell and may contain components to connect or regulate these multiple electrochemical cells.

Batteries of the present invention may be used in a variety of applications. They may be in the form of standard battery size formats usable by a consumer interchangeably in a variety of devices. They may be in power packs, for instance for tools and appliances. They may be usable in consumer electronics including cameras, cell phones, gaming devices, or laptop computers. They may also be usable in much larger devices, such as electric automobiles, motorcycles, buses, delivery trucks, trains, or boats. Furthermore, batteries according to the present invention may have industrial uses, such as energy storage in connection with energy production, for instance in a smart grid, or in energy storage for factories or health care facilities, for example in the place of generators.

EXAMPLES

The following examples are provided to further illustrate specific embodiments of the invention. They are not intended to disclose or describe each and every aspect of the invention in complete detail and should be not be so interpreted.

Example 1

Formation of Nanocomposite Materials

M$_x$Sb—Al$_2$O$_3$—C (M=Fe, Ni, Cu) nanocomposites were synthesized by a reduction of Sb$_2$O$_3$ (99.6%, Alfa Aesar, Ward Hill, Mass.) with aluminum (99.97%, 17 μm, Alfa) and the formation of M$_x$Sb with metal powders (Fe, Ni, and Cu) in the presence of carbon (acetylene black) by a high-energy mechanical milling (HEMM) process. The required stoichiometric amounts of $Sb_2O_3$, Al, and metal were well-mixed with acetylene black in an $Sb_2O_3$—Al-M:C mass ratio of 80:20. All HEMM steps were conducted in a planetary ball mill (Fritsch Pulverisette 6 planetary mill, Fritsch, Idar-Oberstein, Germany) at a speed of 500 rpm at room temperature under argon atmosphere in hardened steel vials of 80 cm$^3$ capacity with steel balls (diameter: ½ and ¼ in.) in a ball:powder mass ratio of 20:1. The vials were sealed inside an argon-filled glove box prior to milling. The milling times for the Sb—$Al_2O_3$—C, $FeSb_2$—$Al_2O_3$—C, NiSb—$Al_2O_3$—C, and $Cu_2Sb$—$Al_2O_3$—C samples were, respectively, 12, 48, 36, and 12 hours Example 2

X-Ray Diffraction Analysis of Nanocomposite Materials

The structural characterization of the synthesized samples was carried out with a Rigaku RINT 2000 diffractometer (Rigaku Americas, The Woodlands, Tex.) and Cu Kα radiation in the range of 20-70° with a scan rate of 0.03° s$^{-1}$.

FIG. 1 shows the XRD patterns of Sb—C, Sb—$Al_2O_3$C, and $M_xSb$—$Al_2O_3$—C (M=Fe, Ni, and Cu) nanocomposites obtained by a mechanochemical reaction. The patterns of all nanocomposites match well with reference XRD reflections, marked by black bars in each graph, illustrating the formation/presence of $FeSb_2$, NiSb, $Cu_2Sb$, and Sb in the respective composites. No reflections corresponding to $Al_2O_3$ could be observed, likely because it is amorphous or poorly crystalline.

Example 3

SEM and TEM Analysis of Nanocomposite Materials

The morphology of Sb—C, Sb—$Al_2O_3$—C, and $M_xSb$—$Al_2O_3$—C nanocomposites was investigated with scanning electron microscopy (SEM) and transmission electron microscopy (TEM). Specifically, the samples were characterized with a JEOL JSM-5610 scanning electron microscope (JEOL USA, Peabody, Mass.) and a JEOL 2010F transmission electron microscope (JEOL USA).

Figure 2:
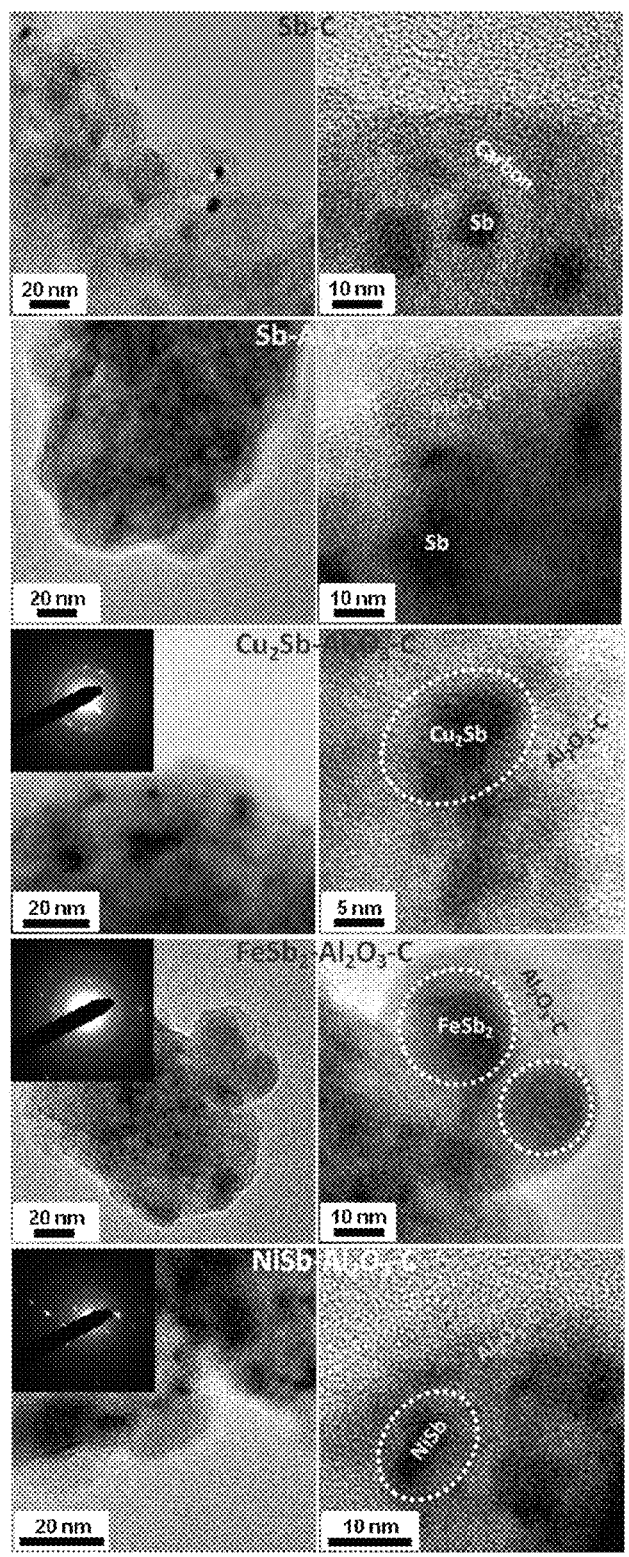
FIG. 2 provides TEM images of Sb—C, Sb—Al$_2$O$_3$—C, and M$_x$Sb—Al$_2$O$_3$—C (M=Fe, Ni, and Cu) nanocomposites before cycling. The insets show diffraction patterns.
Figure 3A:
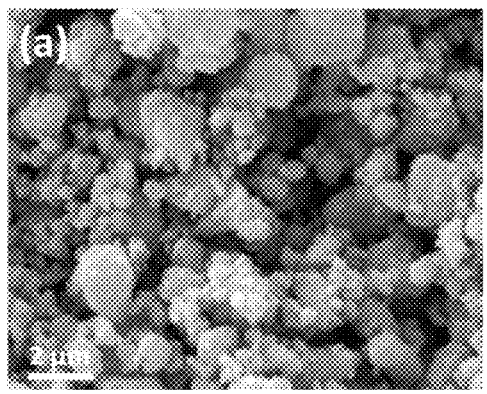
FIG. 3A provides an SEM image of Sb—C
Figure 3B:
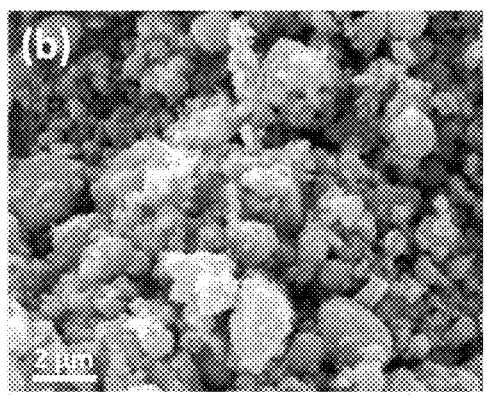
FIG. 3B provides an SEM image of Sb—Al$_2$O$_3$—C.
Figure 3C:
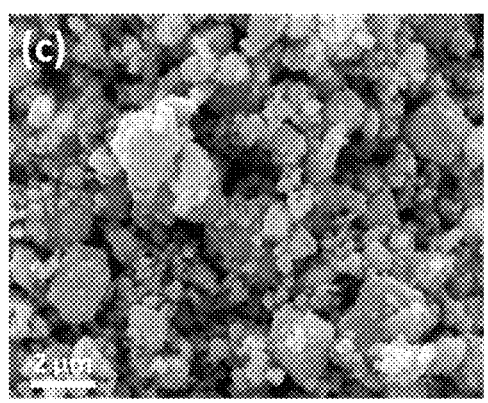
FIG. 3C provides an SEM image of Cu$_2$Sb—Al$_2$O$_3$—C.
Figure 3D:
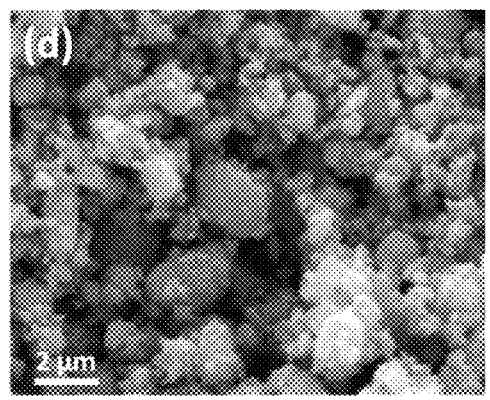
FIG. 3D provides an SEM image of FeSb$_2$—Al$_2$O$_3$—C.
Figure 3E:
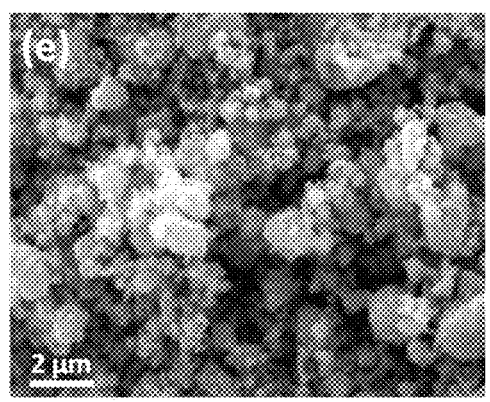
FIG. 3E provides an SEM image of NiSb—Al$_2$O$_3$—C.

FIGS. 2 and 3 show, respectively, the high-resolution TEM images along with selected area electron diffraction (SAED) patterns and SEM images of the as-prepared nanocomposites. All of the as-prepared nanocomposites have similar morphology as shown in FIG. 3, and the diffraction patterns from the TEM images confirm the formation of crystalline $M_xSb$ phases. In addition, the reduced crystalline $M_xSb$ phases with a particle size of 10-15 nm are well surrounded by the amorphous $Al_2O_3$ and carbon. Similar to that in the $M_xSb$—$Al_2O_3$—C nanocomposites, the Sb with a particle size of 10-15 nm is surrounded by carbon or $Al_2O_3$—C in the Sb—C and Sb—$Al_2O_3$—C nanocomposites as well. This homogeneously mixed morphology may provide better electrical contact with the current collector, as well as a buffering the effect of volume expansion-contraction occurring during cycling.

Example 4

Electrochemical Analysis of Nanocomposite Materials

Electrodes for electrochemical tests were prepared by coating a copper foil with a slurry consisting of 70 wt. % $M_xSb$—$Al_2O_3$—C powder as the active material, 15 wt. % carbon black (Super P, Timcal, Bodio, Switzerland) as a conductive agent, 15 wt. % poly(vinylidene fluoride) (PVDF) as a binder, and N-methyl-pyrrolidinone (NMP) as a solvent. The coated copper foil was dried at 60° C. for 3 hours in an oven and at 120° C. overnight under vacuum. The sample electrodes were punched out of the foil to give circular electrodes of 1.27 cm$^2$ area. The electrodes typically had an active material content of 1-1.5 mg. Sodium-ion batteries were assembled with sodium as the counter electrode, 1 M $NaClO_4$ in a mixture of ethylene carbonate/propylene carbonate (EC/PC, 1:1 by volume) as the electrolyte, and a glass separator (APFA, Millipore, Billerica, Mass.). The galvanostatic charge/discharge experiments were performed at a constant current density of 100 mA g$^{-1}$ of active electrode material in the voltage range of 0-2 V. Cyclic voltammetric measurements in the potential window of 0-2 V at a scan rate of 0.1 mV s$^{-1}$ were carried out on a Solartron 1480 (Solartron Analytical, USA) multichannel potentiostat. Electrochemical impedance spectroscopic (EIS) analysis was conducted with a Solatron SI 1260 equipment. A signal of 10 mV in amplitude was applied in the frequency range of 100 kHz to 0.01 Hz. In the EIS measurements, the $M_xSb$—$Al_2O_3$—C nanocomposite served as the working electrodes and sodium foil served as the counter and reference electrodes. The impedance response was measured after various number of cycles (1, 10, 20, 30, 40 50 cycles) at 2 V vs. Na/Na$^+$.

Figure 4A:
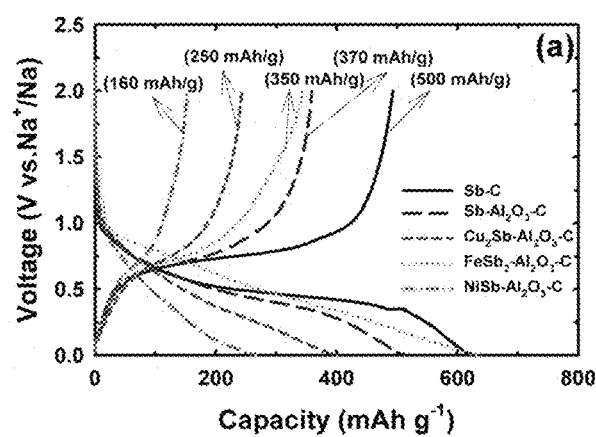
FIG. 4A provides initial voltage profiles of Sb—C, Sb—Al$_2$O$_3$—C, and M$_x$Sb—Al$_2$O$_3$—C (M=Fe, Ni, and Cu) electrodes at a current rate of 100 mA/g.

Sodiation (discharge)/desodiation (charge) reactions were carried out in the voltage range of 0 to 2 V. FIG. 4A shows the first charge/discharge voltage profiles of all the nanocomposites. At a current rate of 100 mA g$^{-1}$, the delivered charge capacity is 500 mAh g$^{-1}$ for Sb—C, 370 mAh g$^{-1}$ for Sb—$Al_2O_3$—C, 250 mAh g$^{-1}$ for $Cu_2Sb$—$Al_2O_3$—C, 350 mAh g$^{-1}$ for $FeSb_2$—$Al_2O_3$—C, and 160 mAh g$^{-1}$ for NiSb—$Al_2O_3$—C. The Coulombic efficiencies of Sb—C, Sb—$Al_2O_3$—C, $Cu_2Sb$—$Al_2O_3$—C, $FeSb_2$—$Al_2O_3$—C, and NiSb—$Al_2O_3$—C are, respectively, 79%, 70%, 60%, 60%, and 62% in the first cycle. Looking at the Coulombic efficiencies, it appears that the incorporation of $Al_2O_3$ and of a metal-supporter lowers the Coulombic efficiency in the first cycle. This irreversible capacity loss is related to the formation of solid-electrolyte interphase (SEI) layer by a reaction of the electrode surface with the electrolyte. Nevertheless, the $M_xSb$—$Al_2O_3$—C nanocomposites exhibit very stable cyclic performance compared to those of Sb—C and Sb—$Al_2O_3$—C with Coulombic efficiencies above 99% after the first cycle.

Figure 4B:
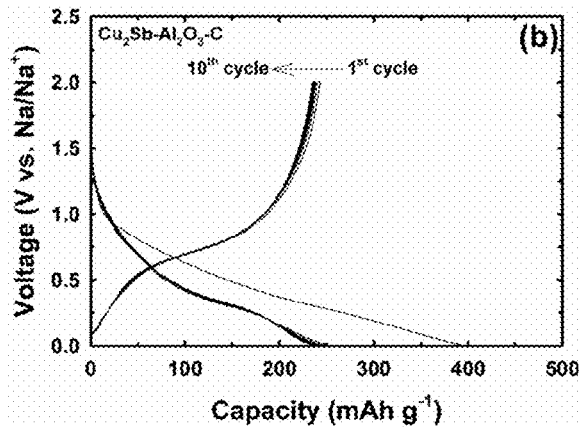
FIG. 4B provides voltage profiles of Cu$_2$Sb—Al$_2$O$_3$—C for 10 cycles at a current rate of 100 mA/g of the active electrode material.
Figure 4C:
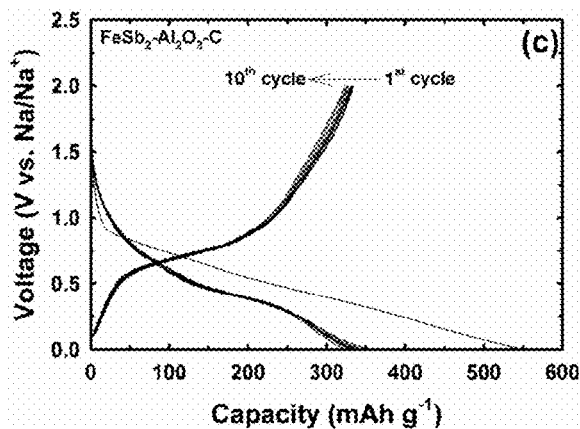
FIG. 4C provides voltage profiles of FeSb$_2$—Al$_2$O$_3$—C for 10 cycles at a current rate of 100 mA g$^{-1}$ of the active electrode material.
Figure 4D:
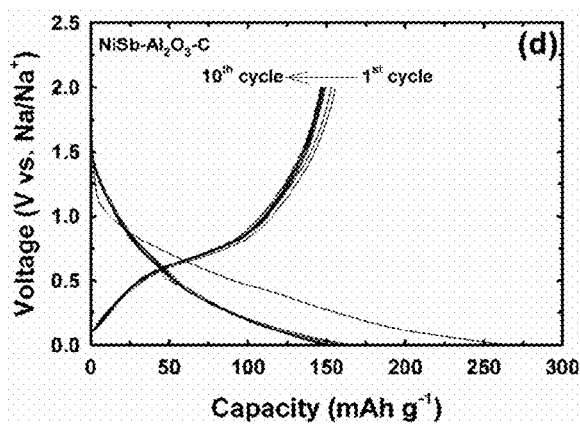
FIG. 4D provides voltage profiles of NiSb—Al$_2$O$_3$—C for 10 cycles at a current rate of 100 mA g$^{-1}$ of the active electrode material.
Figure 6:
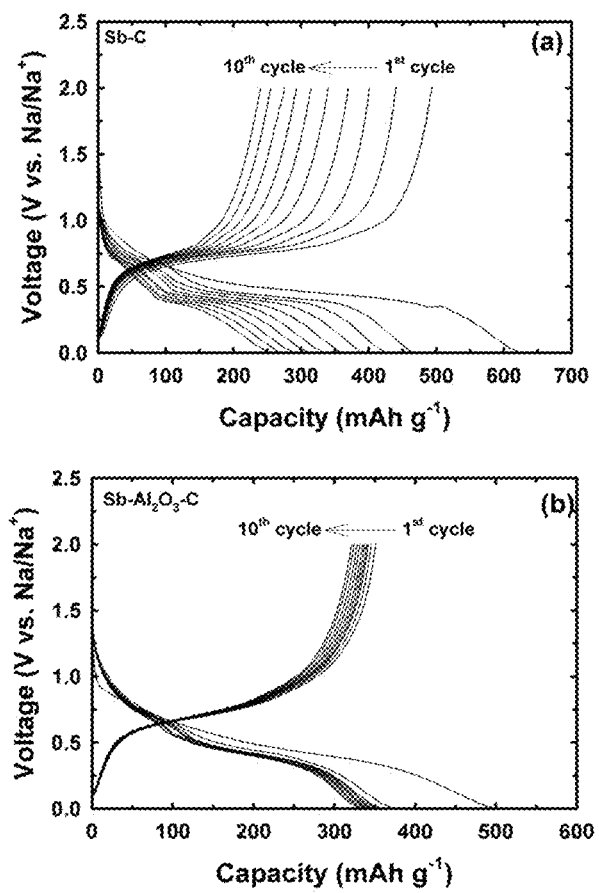
FIG. 6 provides voltage profiles of Sb—C and Sb—Al$_2$O$_3$—C for 10 cycles at a current rate of 100 mA/g of active electrode materials.

The Sb—C and Sb—$Al_2O_3$—C electrodes show higher charge capacities than those of $M_xSb$—$Al_2O_3$—C (M=Fe, Ni, and Cu). However, they display very poor cyclability even in early cycles (FIG. 6). This might be due to the severe aggregation and high volume changes occurring during cycling. Such aggregations combined with large volume changes may destroy the SEI layer during each cycle, leading to the consumption of more Na ions to reform the SEI and thereby poor cyclic performance. The large volume changes can also lead to a crumbling of the electrode and loss of electrical contact with active material, resulting in large capacity loss. In contrast, the $M_xSb$—$Al_2O_3$—C nanocomposite electrodes show stable cyclability over many cycles as seen in FIG. 4B, FIG. 4C and FIG. 4D.

Figure 5A:
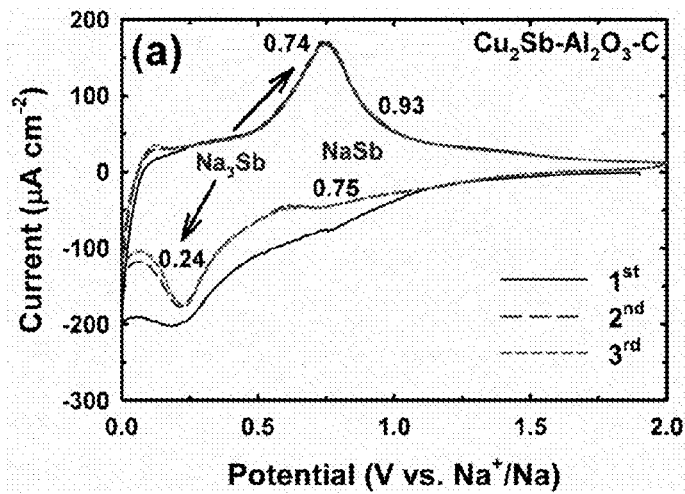
FIG. 5A provides a cyclic voltammogram (CV) of a Cu$_2$Sb—Al$_2$O$_3$—C electrode at 0-2 V and at a scan rate of 0.1 mV/s.
Figure 5B:
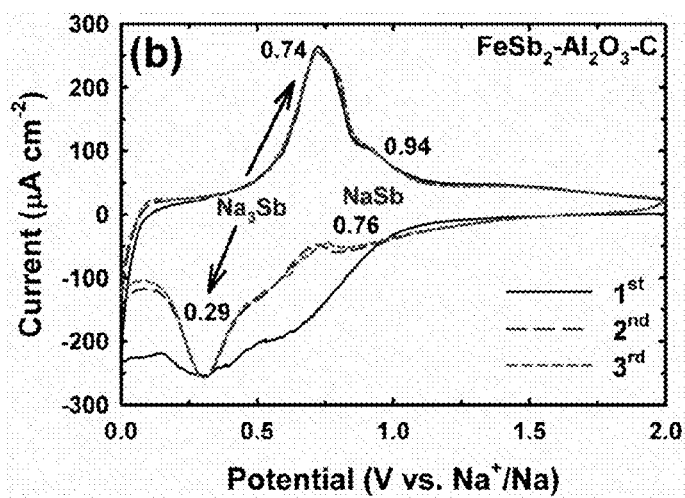
FIG. 5B provides a cyclic voltammogram (CV) of a FeSb$_2$—Al$_2$O$_3$—C electrode at 0-2 V and at a scan rate of 0.1 mV/s.
Figure 7:
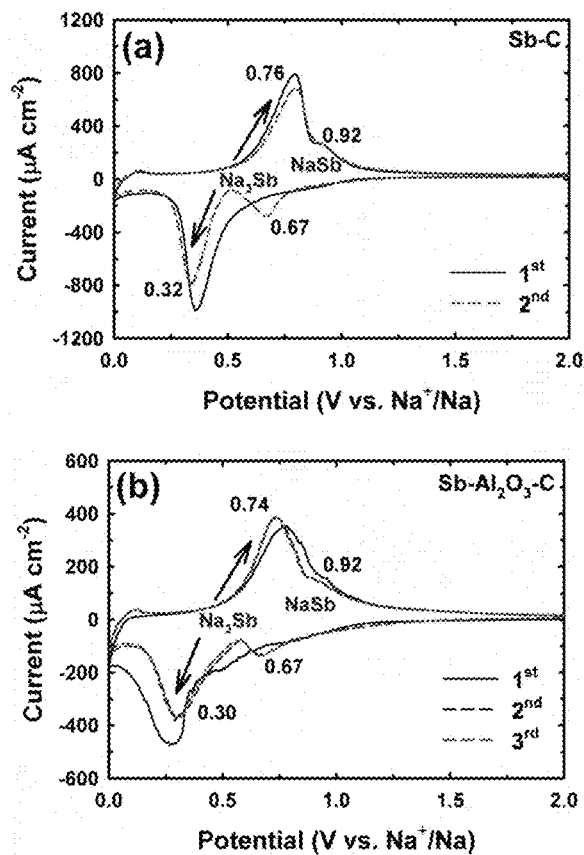
FIG. 7 provides cyclic voltammograms of Sb—C and Sb—Al$_2$O$_3$—C electrodes in the range of 0-2 V at a scan rate of 0.1 mV/s.

With an objective to further understand the charge/discharge process, cyclic voltammetric (CV) plots of several cycles were analyzed for the as-prepared nanocomposite electrodes as shown in FIG. 5 and FIG. 7. In the first discharge scan, all the electrodes show a broad band beginning around 1.0 V, which is related to the formation of SEI layer. In the case of Sb—C and Sb—Al$_2$O$_3$—C, as shown in FIG. 7, there are two redox peaks around 0.67/0.92 V and 0.30/0.75 V. Similarly, the M$_x$Sb—Al$_2$O$_3$—C (M=Fe and Cu) electrode scans display two pairs of redox bands around 0.76/0.93 V and 0.28/0.73 V, suggesting two steps of Na alloying/deallying reactions. These two pairs of redox bands can be ascribed to the formation of NaSb and Na$_3$Sb phases:

  (1)

  (2)

In contrast, the NiSb—Al$_2$O$_3$—C electrode displays a single redox peak around 0.38/0.71 V. The two-step vs single-step reaction may be related to the differences in the reaction with sodium of different metal-supported-antimony.

Figure 8A:
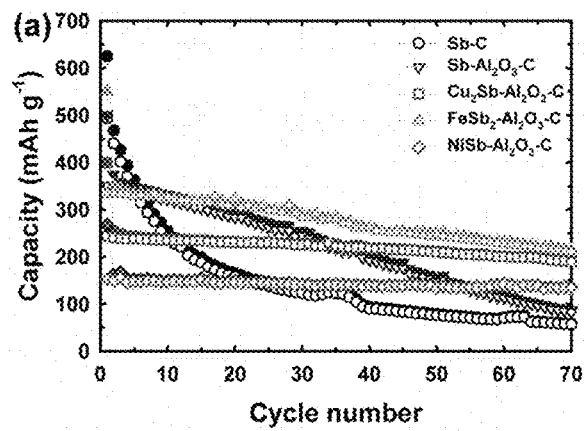
FIG. 8A presents cyclic performance of Sb—C, Sb—Al$_2$O$_3$—C, and M$_x$Sb—Al$_2$O$_3$—C (M=Fe, Ni, and Cu) at 0-2 V vs. Na/Na$^+$ and a current density of 100 mA/g of active electrode material.
Figure 8B:
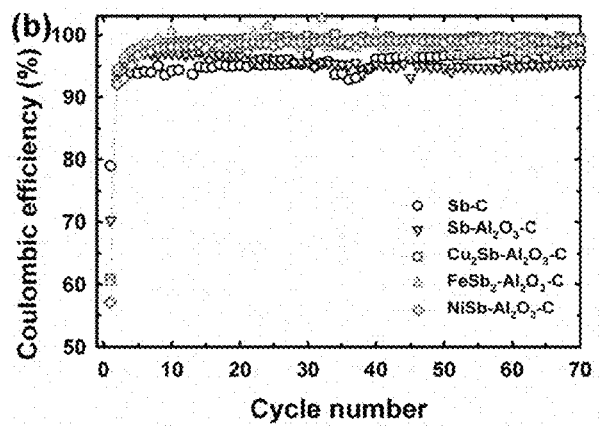
FIG. 8B presents Coulombic efficiency of Sb—C, Sb—Al$_2$O$_3$—C, and M$_x$Sb—Al$_2$O$_3$—C (M=Fe, Ni, and Cu) at 0-2 V vs. Na/Na$^+$ and a current density of 100 mA/g of active electrode material.
Figure 8C:
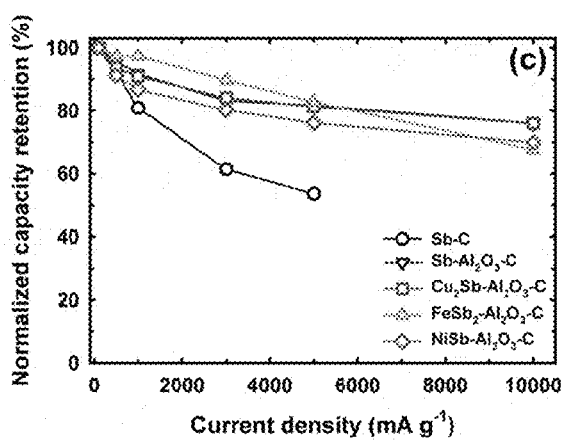
FIG. 8C presents a comparison of normalized capacity vs. current density of Sb—C, Sb—Al$_2$O$_3$—C, and M$_x$Sb—Al$_2$O$_3$—C (M=Fe, Ni, and Cu) electrodes.
Figure 8D:
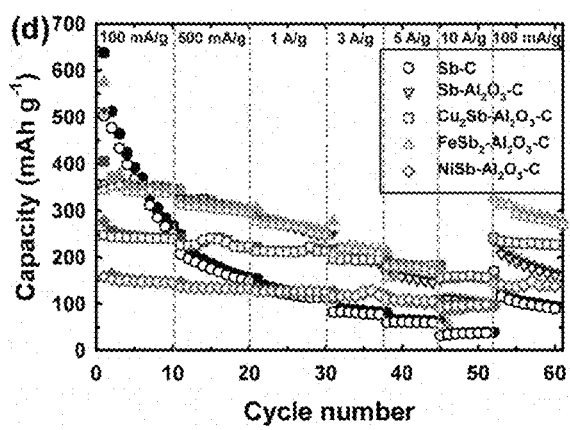
FIG. 8D presents rate performances of Sb—C, Sb—Al$_2$O$_3$—C, and M$_x$Sb—Al$_2$O$_3$—C (M=Fe, Ni, and Cu) electrodes at different current densities from 100 to 10,000 mA/g.
Figure 9:
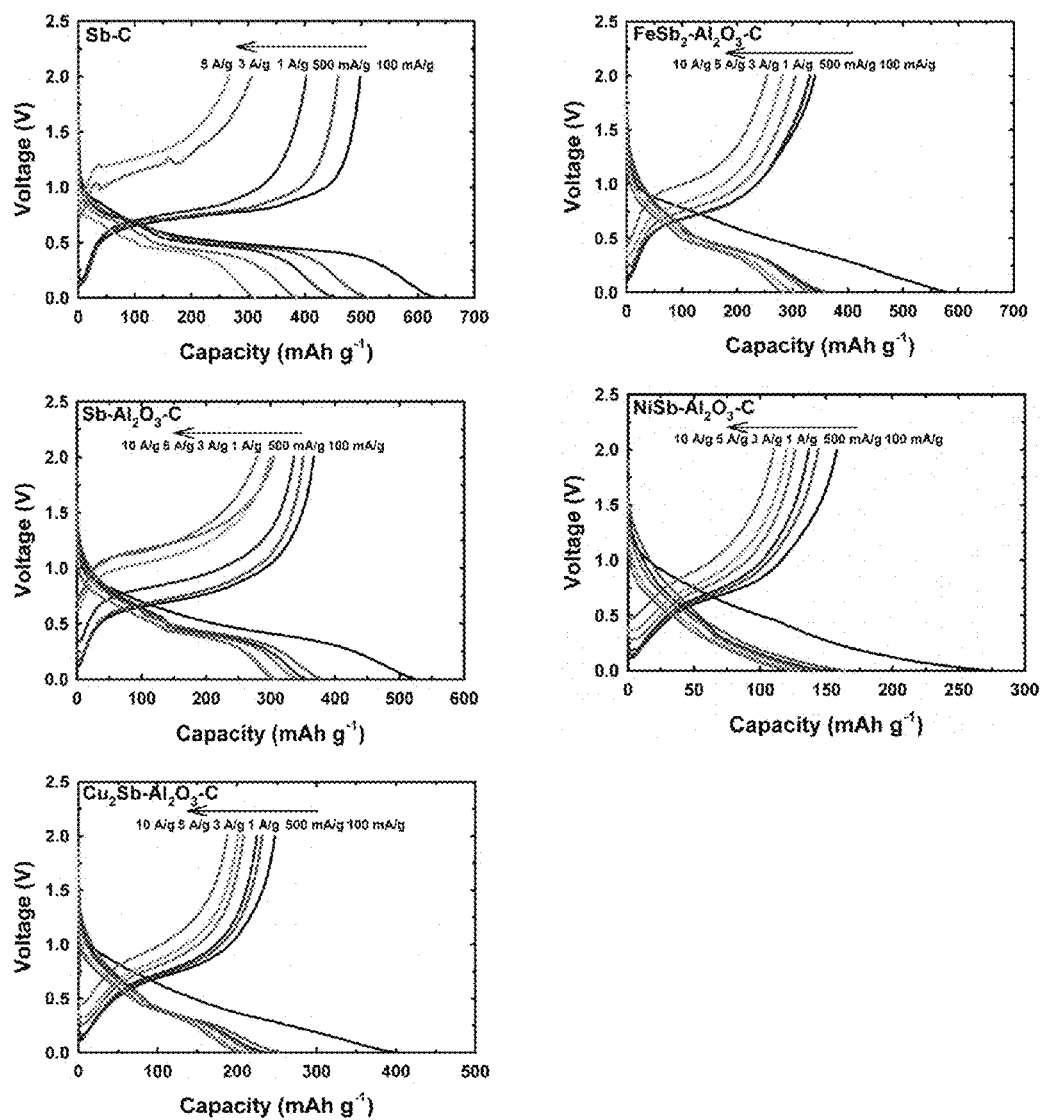
FIG. 9 presents charge/discharge voltage profiles of Sb—C, Sb—Al$_2$O$_3$—C, and M$_x$Sb—Al$_2$O$_3$—C (M=Fe, Ni, and Cu) electrodes at various current densities from 100 to 10,000 mA/g.

FIG. 8A and FIG. 8B compare the cyclic performance and Coulombic efficiency of Sb—C, Sb—Al$_2$O$_3$—C, and M$_x$Sb—Al$_2$O$_3$—C nanocomposites between 0 and 2 V at a constant current of 100 mA g$^{-1}$. The Sb—C electrode exhibits continuous capacity fading and reaches 76 mAh g$^{-1}$ after 50 cycles, which is only about 15% of the initial capacity, indicating its poor capacity retention. The Sb—Al$_2$O$_3$—C electrode exhibits better cyclability than the Sb—C electrode. However, it also shows gradual capacity decay and has a low capacity retention of 42% after 50 cycles. On the other hand, the M$_x$Sb—Al$_2$O$_3$—C electrodes show stable cyclability and a capacity retention of 80% for Cu$_2$Sb—Al$_2$O$_3$—C, 65% for FeSb$_2$—Al$_2$O$_3$—C, and 90% for NiSb—Al$_2$O$_3$—C even after 70 cycles as shown in FIG. 8A In addition to the cyclic performance, the M$_x$Sb—Al$_2$O$_3$—C electrodes also exhibit remarkably high-rate capability. FIG. 8C, FIG. 8D and FIG. 9 show the rate performance of the as-prepared nanocomposites. As shown in FIG. 9, the M$_x$Sb—Al$_2$O$_3$—C nanocomposites deliver better rate capability than the Sb—C and Sb—Al$_2$O$_3$—C composites, and FIG. 8C summarizes the results of normalized capacity retention vs. current rate. Furthermore, M$_x$Sb—Al$_2$O$_3$—C nanocomposites exhibit excellent high-rate cycling performance. For instance, the Cu$_2$Sb—Al$_2$O$_3$—C electrode delivers a capacity of 230, 215, 196, 183, and 160 mAh g$^{-1}$ at current rates of, respectively, 500, 1,000, 3,000, 5,000, 10,000 mA g$^{-1}$ with capacity retentions of 98, 88, 80, 76, and 67% at each current rate, as shown in FIG. 8D.

Figure 10:
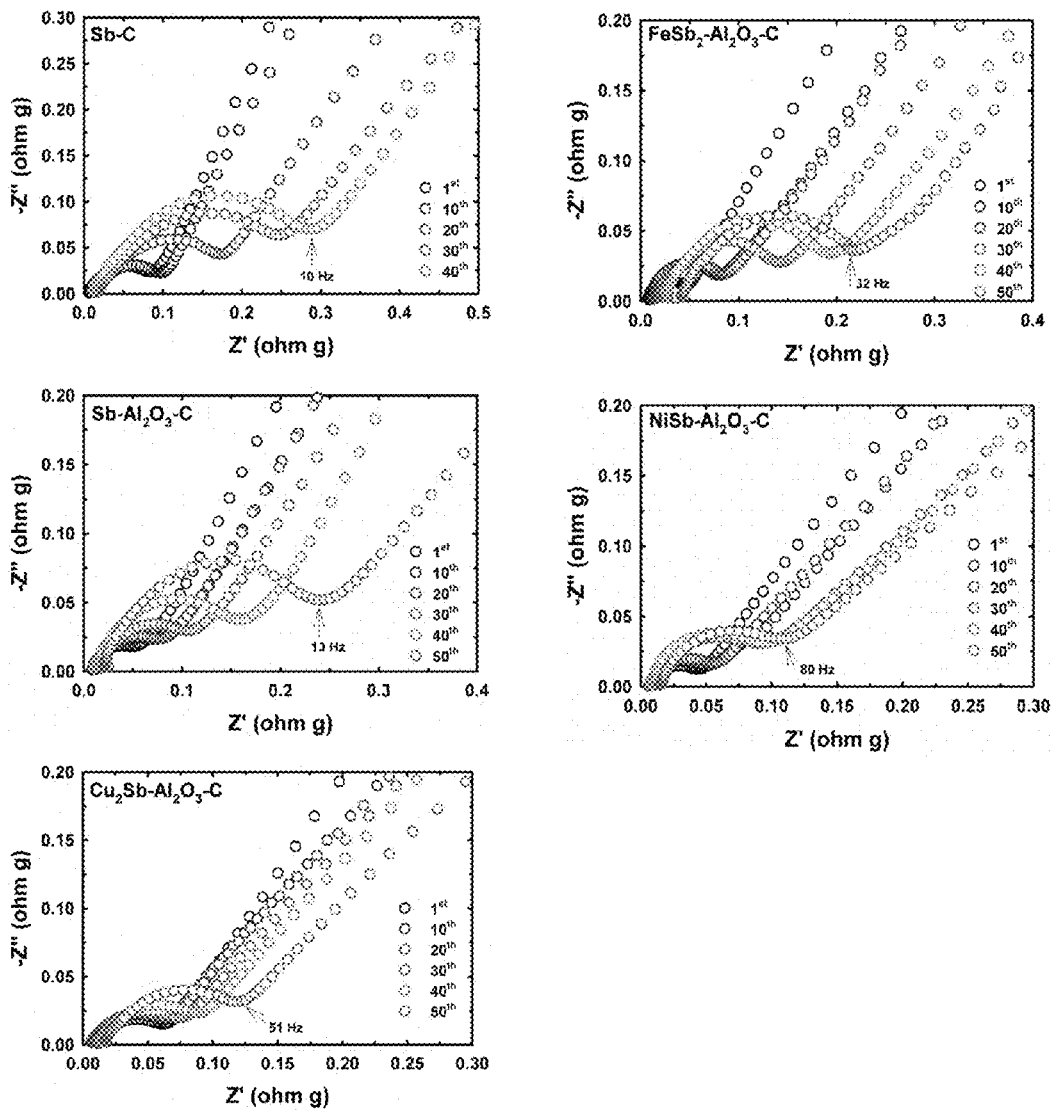
FIG. 10 presents EIS spectra of Sb—C, Sb—Al$_2$O$_3$—C, and M$_x$-Sb—Al$_2$O$_3$—C (M=Fe, Ni, and Cu) electrodes at various cycle numbers.
Figure 11:
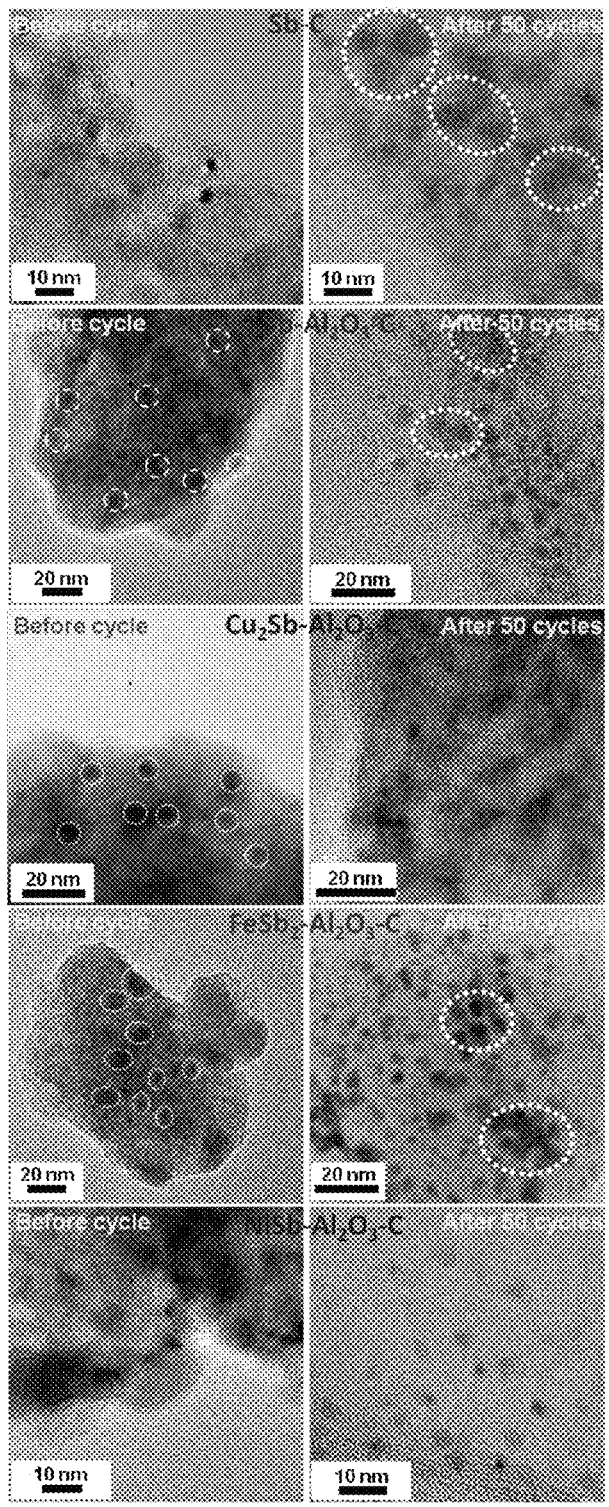
FIG. 11 provides a TEM images of Sb—C, Sb—$Al_2O_3$—C and $M_x$Sb—$Al_2O_3$—C (M=Fe, Ni, and Cu) samples before cycling (left) and after 50 cycles (right).

To better understand the cyclic performance of the M$_x$Sb—Al$_2$O$_3$—C electrodes, electrochemical impedance spectroscopic analysis (EIS) and morphology characterization with TEM were conducted. The impedance was measured after 1, 10, 20, 30, 40, and 50 cycles, and the results are presented in FIG. 10. Generally, the EIS spectrum can be divided into three frequency regions: low frequency, medium-to-low frequency, and high frequency, which correspond, respectively, to cell geometric capacitance, charge transfer reaction, and sodium-ion diffusion through the surface layer. The slope of the impedance curve in the low frequency region is related to sodium-ion diffusion in the bulk of the active material. A semicircle is observed for each of the high and medium-to-low frequency ranges. While the impedance of Sb—C and Sb—Al$_2$O$_3$—C drastically increase during cycling, the impedance of M$_x$Sb—Al$_2$O$_3$—C electrodes show only a gradual increase and their impedances are much less than those of the Sb—C and Sb—Al$_2$O$_3$—C electrodes. Among the M$_x$Sb—Al$_2$O$_3$—C electrodes, the impedance is in the following order: NiSb—Al$_2$O$_3$—C<Cu$_2$Sb—Al$_2$O$_3$—C<FeSb$_2$—Al$_2$O$_3$—C. Furthermore, when observing the morphology of the as-prepared materials before and after 50 cycles, it is noted that the particle sizes of Sb—C and Sb—Al$_2$O$_3$—C are greatly increased and several particles in many regions are aggregated to each other after cycling as shown in FIG. 11A and FIG. 11B, resulting in an increase in impedance during cycling. In contrast, the particle sizes of M$_x$Sb—Al$_2$O$_3$—C samples after 50 cycles do not present any dramatic increase. For example, the NiSb—Al$_2$O$_3$—C sample has similar particle sizes before and after 50 cycles as shown in FIG. 11E. Also, in the case of FeSb$_2$—Al$_2$O$_3$—C, it is noted that there are some regions where particles are agglomerated after 50 cycles. The extent of particle dispersion after 50 cycles is in the following order: FeSb$_2$—Al$_2$O$_3$—C<Cu$_2$Sb—Al$_2$O$_3$C<NiSb—Al$_2$O$_3$—C. Therefore, the results from the impedance analysis and morphology study are in good agreement with the cyclability data performed at 100 mA g$^{-1}$, illustrating that the NiSb—Al$_2$O$_3$—C and Cu$_2$Sb—Al$_2$O$_3$—C electrodes exhibit better cyclic performance than the FeSb$_2$—Al$_2$O$_3$—C electrode as shown in FIG. 8A.

Example 5

Ex Situ XRD Analysis of Nanocomposite Materials

For ex situ XRD measurements to further determine the Na-storage mechanism in the M$_x$Sb—Al$_2$O$_3$—C electrodes, the electrochemical cells tested as in Example 4 were and at different states were disassembled in an Ar-filled glove box. The electrodes were taken out and rinsed with anhydrous dimethyl carbonate to remove the residual salts.

Figure 12:
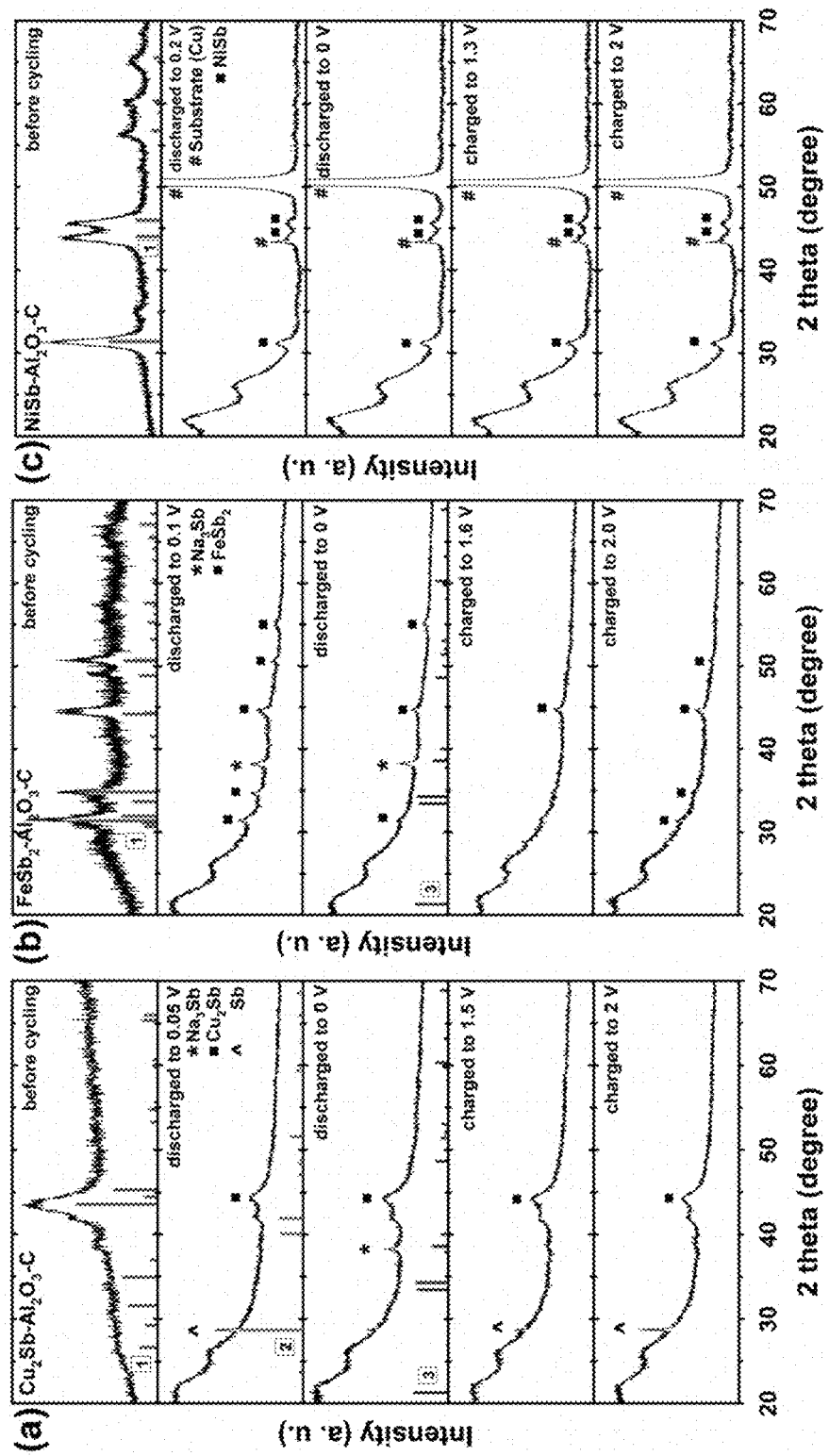
FIG. 12 provides ex situ XRD patterns of $Cu_2$Sb—$Al_2O_3$—C, $FeSb_2$—$Al_2O_3$—C, and NiSb—$Al_2O_3$—C electrodes during sodiation/desodiation. The bars marked as [1] refer to $Cu_2$Sb, $FeSb_2$, and NiSb reference patterns in each plot, and bars marked as [2] and [3] refer, respectively, to Sb and $Na_3$Sb reference patterns.
Figure 13:
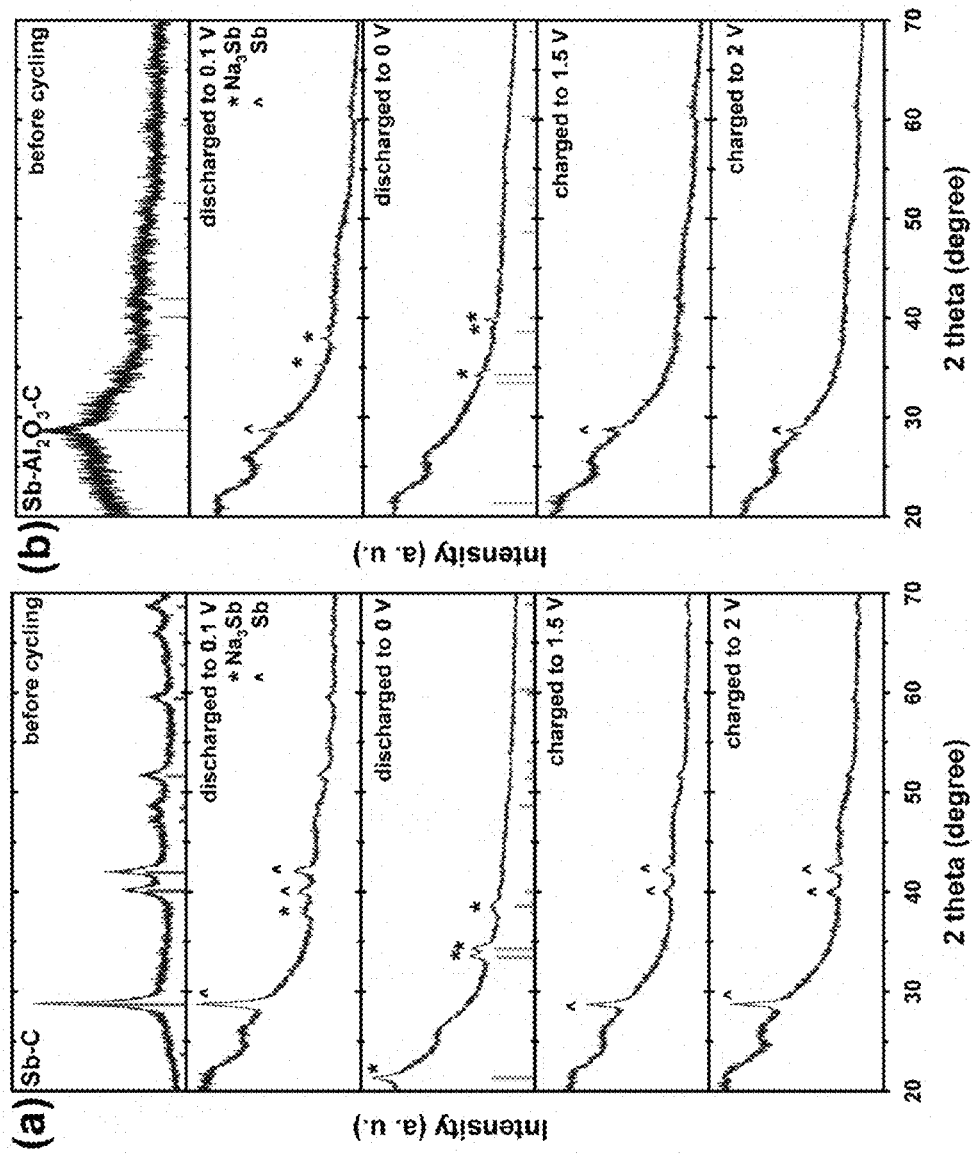
FIG. 13 provides ex situ XRD patterns of Sb—C and Sb—$Al_2O_3$—C electrodes during sodiation/desodiation. The red bars refer to Sb reference pattern and the green bars refer to $Na_3$Sb reference patterns.

FIGS. 12 and 13 compare the ex situ XRD patterns of Sb—C, Sb—Al$_2$O$_3$—C, and M$_x$Sb—Al$_2$O$_3$—C nanocomposite anodes. In the case of SbC electrode, as shown in the XRD pattern in FIG. 13, the antimony reflections disappear during sodiation (0.1 V and 0 V; alloying) and new reflections at 2θ=21.3°, 26.9°, 33.4°, and 38.6° appear, confirming the formation of Na$_3$Sb phase. During desodiation (1.5 V and 2 V; dealloying), the Na$_3$Sb reflections disappear and reflections at 28.7°, 40.1°, and 41.9° are observed again after full desodiation, indicating the reformation of crystalline Sb phase. The Sb—Al$_2$O$_3$—C electrode shows a tendency similar to that of Sb—C as shown in FIG. 13. However, the XRD pattern of the Sb—Al$_2$O$_3$—C nanocomposite is not as clear before cycling when compared to that of Sb—C nanocomposite. Nevertheless, the Sb—Al$_2$O$_3$—C nanocomposite shows a peak at 28.7° after full desodiation (2 V), indicative of the formation of a less crystalline Sb phase during desodiation.

Figure 5C:
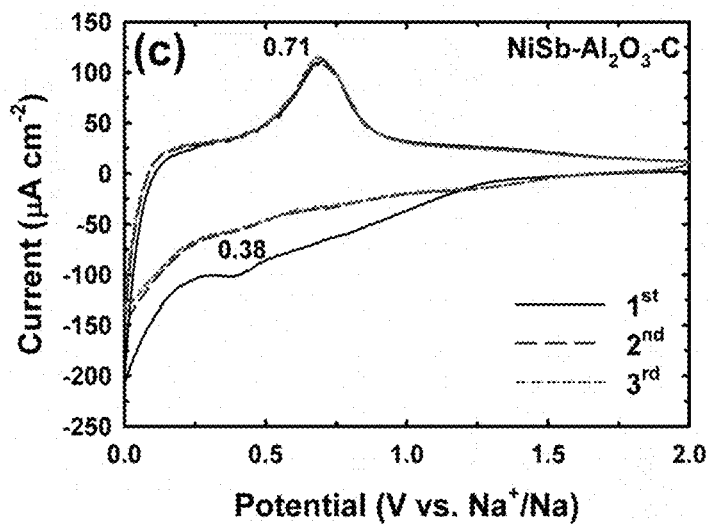
FIG. 5C provides a cyclic voltammogram (CV) of a NiSb—Al$_2$O$_3$—C electrode at 0-2 V and at a scan rate of 0.1 mV/s.

FIG. 12 shows the ex situ XRD patterns of the Cu$_2$Sb—Al$_2$O$_3$—C electrode. When sodiated to 0.05 V, an additional reflection at 28.7° appears in addition to those of Cu$_2$Sb phase, which matches well with the antimony reflection. This suggests that Cu$_2$Sb may form the Sb phase during initial sodiation. After full sodiation, the reflection at 28.7° corresponding to antimony is no longer present, but a new reflection at 38.6° appears, which is evidence of the formation of the Na$_3$Sb phase. During desodiation, the Na$_3$Sb reflection disappears and the reflections corresponding to antimony and Cu$_2$Sb phases are observed again. This suggests that both the Cu$_2$Sb and Sb phases coexist after cycling. In the case of the FeSb$_2$—Al$_2$O$_3$—C electrodes, as shown in FIG. 12, the Na-storage mechanism is similar to that of Cu$_2$Sb—Al$_2$O$_3$—C. During sodiation (discharged to 0.1 V), a new reflection at 38.6° starts to appear in addition to those of FeSb$_2$ phase. After full sodiation, most of the FeSb$_2$ reflections have disappeared and a reflection for the Na$_3$Sb phase is observed. Subsequently, during desodiation, the Na$_3$Sb peak disappears as expected. However, the intensity of FeSb$_2$ reflection is very weak, unlike for the Cu$_2$Sb—Al$_2$O$_3$—C electrode, illustrating the formation of disordered or less crystalline FeSb$_2$. On the other hand, the NiSb—Al$_2$O$_3$—C electrode does not exhibit prominent reactions between Sb and Na ion during sodiation/desodiation (FIG. 12). However, even though the formation of Na$_3$Sb phase could not be observed via the ex situ XRD measurement, there must be a weak reaction between Ni-supported Sb and Na ion. This can be illustrated and confirmed from the CV plot, which presents the smallest peak current and integrated area for the discharge peak compared to others as shown in FIG. 5C. As a result, the charge capacity of NiSb—Al$_2$O$_3$—C electrode exhibits lower value (~160 mAh g$^{-1}$) than those of the other samples.

Although only exemplary embodiments of the invention are specifically described above, it will be appreciated that modifications and variations of these examples are possible without departing from the spirit and intended scope of the invention. For instance, numeric values expressed herein will be understood to include minor variations and thus embodiments "about" or "approximately" the expressed numeric value unless context, such as reporting as experimental data, makes clear that the number is intended to be a precise amount.

The invention claimed is:

1. A rechargeable sodium-ion battery comprising an anode material comprising:
   a matrix having the general formula AO$_x$—C, wherein A is selected from the group consisting of aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), tantalum (Ta), silicon (Si), and any combinations thereof; and
   an electrochemically active nanoparticle, wherein the matrix contains the nanoparticle and wherein the nanoparticle may react with sodium ion (Na$^+$) during cycling of the rechargeable sodium-ion battery.

2. The battery of claim 1, wherein the anode material has the general formula
   M$_y$Sb-M'O$_x$—C, wherein M is selected from the group consisting of iron (Fe) copper (Cu), molybdenum (Mo), nickel (Ni), titanium (Ti), tin (Sn), and any combinations thereof, and M' is selected from the group consisting of aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), tantalum (Ta), and any combinations thereof.

3. The battery of claim 2, wherein the anode material has the general formula Cu$_2$Sb—Al$_2$O$_3$—C.

4. The battery of claim 2, wherein the anode material has the general formula FeSb$_2$—Al$_2$O$_3$—C.

5. The battery of claim 2, wherein the anode material has the general formula NiSb—Al$_2$O$_3$—C.

6. The battery of claim 1, wherein the anode material has the general formula Sb-MO$_x$—C, where M is selected from the group consisting of aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), and any combinations thereof.

7. The battery of claim 6, wherein the anode material has the general formula Sb—Al$_2$O$_3$—C.

8. The battery of claim 1, wherein battery exhibits a reversible capacity of 200 mAh/g to 400 mAh/g at a current density of C/3 or higher.

* * * * *